(12) United States Patent
Browning et al.

(10) Patent No.: US 7,653,910 B2
(45) Date of Patent: *Jan. 26, 2010

(54) APPARATUS FOR THREAD-SAFE HANDLERS FOR CHECKPOINTS AND RESTARTS

(75) Inventors: Luke Matthew Browning, Austin, TX (US); Suresh Eswara Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/029,193

(22) Filed: Feb. 11, 2008

(65) Prior Publication Data

US 2008/0141255 A1 Jun. 12, 2008

Related U.S. Application Data

(63) Continuation of application No. 10/339,753, filed on Jan. 9, 2003, now Pat. No. 7,337,444.

(51) Int. Cl.
 *G06F 12/00* (2006.01)
(52) U.S. Cl. ...................... 718/107; 710/200
(58) Field of Classification Search ............ 718/100, 718/107; 717/127–130; 710/200, 244; 709/216, 709/224; 712/228, 239; 714/15–17
 See application file for complete search history.

(56) References Cited

U.S. PATENT DOCUMENTS 5,317,739 A    5/1994  Elko et al.
5,649,136 A    7/1997  Shen et al.
5,655,115 A    8/1997  Shen et al.
5,742,830 A    4/1998  Elko et al.
5,802,267 A    9/1998  Shirakihara et al.
5,862,376 A    1/1999  Steele et al.
6,523,059 B1   2/2003  Schmidt
6,546,443 B1   4/2003  Kakivaya et al.
6,647,510 B1  11/2003  Ganesh et al.
6,801,938 B1  10/2004  Bookman et al.
6,832,367 B1  12/2004  Choi et al.
7,047,394 B1   5/2006  Van Dyke et al.
7,206,964 B2   4/2007  Moser et al.
6,782,392 B1  10/2007  Weinberger et al.
2003/0187911 A1 10/2003  Abd-El-Malek et al.
2005/0034014 A1  2/2005  Moser et al.

OTHER PUBLICATIONS

Karablieh et al., "Heterogeneous Checkpointing for Multithreaded Applications", 2002 IEEE, pp. 140-149.
Kasbeka et al., "Selective checkpointing and rollbacks in Multithreaded Distributed Systems", 2001, IEEE, pp. 39-46.
Whisnant et al., "Micro-Checkpointing: Checkpointing for Multithread Applications", 20000 IEEEE, pp. 1-6.

*Primary Examiner*—Van H Nguyen
(74) *Attorney, Agent, or Firm*—Yee & Associates, P.C.; Diane R. Gerhardt

(57) ABSTRACT

A method, apparatus, and computer instructions for executing a handler in a multi-threaded process handling a number of threads in a manner that avoids deadlocks. A value equal to the number of threads executing in the data processing system is set. The value is decremented each time a lock count for a thread within the number of threads is zero. A thread within the number of threads is suspended if the thread requests a lock and has a lock count of zero. A procedure, such as a handler, is executed in response to all of the threads within the number of threads having no locks.

2 Claims, 5 Drawing Sheets

APPARATUS FOR THREAD-SAFE HANDLERS FOR CHECKPOINTS AND RESTARTS

This application is a continuation of application Ser. No. 10/339,753, filed Jan. 9, 2003, now U.S. Pat. No. 7,337,444.

BACKGROUND OF THE INVENTION

1. Technical Field:

The present invention relates generally to an improved data processing system, and in particular, to a method and apparatus for processing data. Still more particularly, the present invention provides a method and apparatus for managing threads executing in a data processing system.

2. Description of Related Art:

Checkpoints are often used in a method for recovering from a system failure. A checkpoint is a copy of the state of the data processing system, which is periodically saved. This state includes, for example, the contents of the memory in the data processing system as well as current register settings. These register settings may include, for example, the last executed instruction. In the event of a failure, the last checkpoint may serve as a recovery point. A restart program may copy the last checkpoint into memory, reset the hardware registers, and start the data processing system from that checkpoint.

A checkpoint is thus used to save the state of the processes of an application. A process is the execution state of a program. Often a process can be broken into multiple execution states, which can run in parallel. Each of these execution states share the same data and global state, such as open files, shared memory, and program text, etc., however, they have their own execution context with their own stack and registers. These are called threads of a process. When multiple threads in a user space are multiplexed to run on a single kernel thread, the user threads are called lightweight processes. In Advanced Interactive Executive (AIX), these threads also are referred to as pthreads and the library that handles the switching of pthreads in a user space is the pthreads library. From the kernel perspective, there is only a single thread, however, the pthreads library may run several pthreads on a single kernel thread. The two popular models are the M:N model, where 'N' pthreads are serviced by (or multiplexed on) 'M' kernel threads and M is usually less than N, or the 1:1 model where there is one kernel thread for each pthread.

Processes often require special handling at checkpoint and restart time, which is handled by running application handlers, one at checkpoint time and one at restart time. These are usually implemented as signal handlers or event handlers, which execute under the context of one of the threads of the process. The thread is interrupted from its current execution, its execution state is saved, and control is passed to the handler. When the handler completes, the state of the thread is restored and the thread resumes execution from the point it was interrupted. A process will need to register for handlers if the process owns non-checkpoint safe resources like Internet sockets whose complete state cannot be saved in the checkpoint file because the other end of the socket is on a different system. In this case, the handler can save the details of the socket at checkpoint time, reopen the socket at restart time, and perform any other initialization necessary to restore the socket to the state it was at checkpoint time. Checkpoint handlers may also be needed to convert the process into a checkpointable state.

Currently, signal handlers and checkpoint handlers, which are usually implemented as signal handlers, are restricted to a limited set of application program interface calls (API) or system calls, which do not require taking of any internal pthread locks. The restricted set of calls is currently used because if a thread is interrupted to handle a signal and the thread is in the middle of an API that has taken a lock and the signal handler invokes the same API, a deadlock occurs. This deadlock occurs because the signal handler would block and wait for the lock to be released. A "lock" is used to prevent other threads or processes from accessing a resource, such as a memory location or a register. The lock owner, the interrupted thread, will block waiting for the signal handler to complete, resulting in a deadlock. This same situation exists in the case in which the signal handler tries to acquire a mutex. A "mutex" is a programming flag used to grab and release an object. A mutex may be set to lock such that other attempts to use the object are blocked. A mutex is set to unlock when the data is no longer needed or the routine finishes.

Signal handlers, checkpoint and restart handlers are examples of procedures. A procedure is a series of steps followed in a regular definite order, for example a legal procedure or a surgical procedure. In computer systems, a procedure is a series of instructions that has a name by which the procedure can be called into action.

Many calls used in a data processing system will take internal locks when running in a multithreaded state to serialize execution. For example, the call "malloc" takes a lock to protect its internal heap structure. The problem of deadlocking is a bigger problem with respect to checkpoint/restart processes. Specifically, requirements for a checkpoint handler are usually more complex than a signal handler. As described earlier, the purpose of the checkpoint handler is often to make a process quiescent to enable it be checkpointed. For parallel applications that execute across many nodes, this requirement may involve making calls to the MPI (or Message Passing Interface library) and the LAPI (or Low-Level Application Programming Interface, a high-performance communication library on IBM SP systems) subsystems and closing devices that cannot be checkpointed like Internet sockets. It is often impossible to code these calls without taking mutexes or making non-thread safe calls.

In addition, with respect to deadlocks, at restart time, the restart handler is called before the rest of the application threads start running. This is to handle resources that were not checkpointed by the system and hence not restored automatically, such as Internet sockets, devices with non-checkpoint aware device drivers, and pipes to processes outside the group of processes being checkpointed. The primary task of the restart handler is to restore the state of the application such that threads using these resources run successfully and do not have to be aware of checkpoint-restart happening asynchronously.

With these requirements, the threads in a process are suspended until the restart handler completes execution or exits. Hence if any of the threads were in the middle of an API call that took a lock or owned a mutex and the restart handler invoked the same API call or tried to acquire the same mutex, these threads would block the use of that resource indefinitely causing a deadlock.

Therefore, it would be advantageous to have an improved method, apparatus, and computer instructions for checkpoint and restart handlers in multi-threaded processes to avoid deadlocks.

SUMMARY OF THE INVENTION

The present invention provides a method, apparatus, and computer instructions for handling a number of threads in a manner that avoids deadlocks when executing checkpoint and restart handlers in a 1:1 environment. Each thread maintains a lock count, which identifies the number of locks and mutexes held by the thread. When a checkpoint becomes pending for a process, a value equal to the number of threads executing in the process is set. The value is decremented by each thread that has no locks to start with at the time the value is set. The value also is decremented each time the lock count for the other threads (those whose lock count was not 0 when checkpoint became pending) becomes 0. A thread is suspended if the thread requests a lock and has a lock count of zero. When the value becomes 0, then the handler is executed in one of threads in the process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
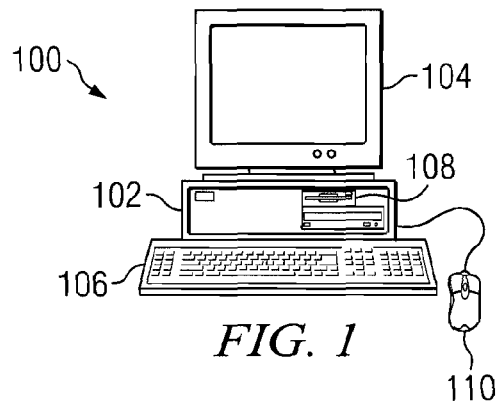
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
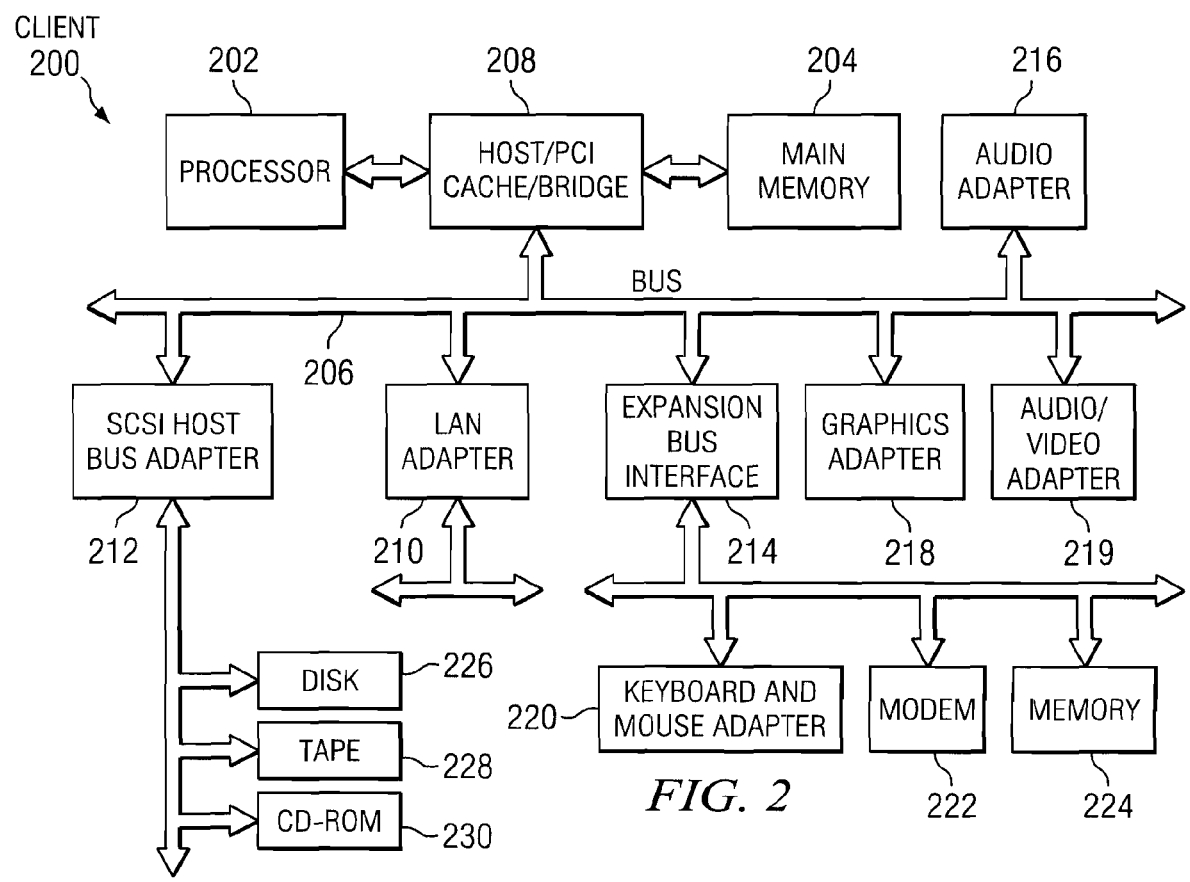
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM drive 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

The present invention provides a mechanism that allows for a checkpoint or restart handler to make thread API calls or acquire any mutexes without any deadlocks occurring. The mechanism of the present invention guarantees that no blocking will occur on a lock or mutex. The mechanism of the present invention ensures that a handler, such as a checkpoint or restart handler, is invoked only when no threads are holding locks within a process. The mechanism of the present invention waits until such a condition is reached before starting a checkpoint handler instead of handling the checkpoint signal immediately. Once the checkpoint handler starts running, any thread that attempts to take a lock is automatically suspended.

To handle conditions in which threads are continually taking and releasing locks, two rules are enforced in the depicted examples. First, once a checkpoint is pending, a thread that does not own any locks is suspended if that thread attempts to take a lock. Additionally, a thread that owns one or more locks is allowed to take additional locks.

Because no thread owns any locks or mutexes and because the checkpoint handler thread releases all mutexes before the checkpoint handler completes or exits, the restart handler also will be able to make any thread calls or acquire any mutexes as necessary. As an optimization because all threads are suspended, the restart handler does not need to acquire any mutexes unless the restart handler creates new threads and needs to serialize with them.

In the depicted examples, the checkpoint handler can be called only when no locks are owned by any of the threads in the process. A global lock field in the pthread library may be used to keep track of the number of locks taken at the pthread level. Mutexes are represented internally by structures in the heap that contain a pthread lock and the owner of the lock is the owner of the mutex. Thus, the global lock field represents the total lock count of the thread including mutexes. However, when a checkpoint is issued on a process, an atomic check cannot be made to determine if the lock count is 0 for every pthread in the process. This situation is present because walking the pthread list and checking each pthread's lock count can only be performed asynchronously and the lock count may change while the count is being read.

In the depicted examples, pthreads that own locks may be made to detect and report the condition when their lock count goes to 0 if the checkpoint is pending by suitably modifying the unlocking primitives. A primitive or locking primitive is a lowest level lock routine performing an implementation of a lock. However, this procedure does not work for pthreads that never take a lock. Additional code is executed under the context of each pthread when the checkpoint is issued to make an initial check of the pthread's lock count. This code may be implemented as a handler for a special signal, SIGADVH.

Figure 3:
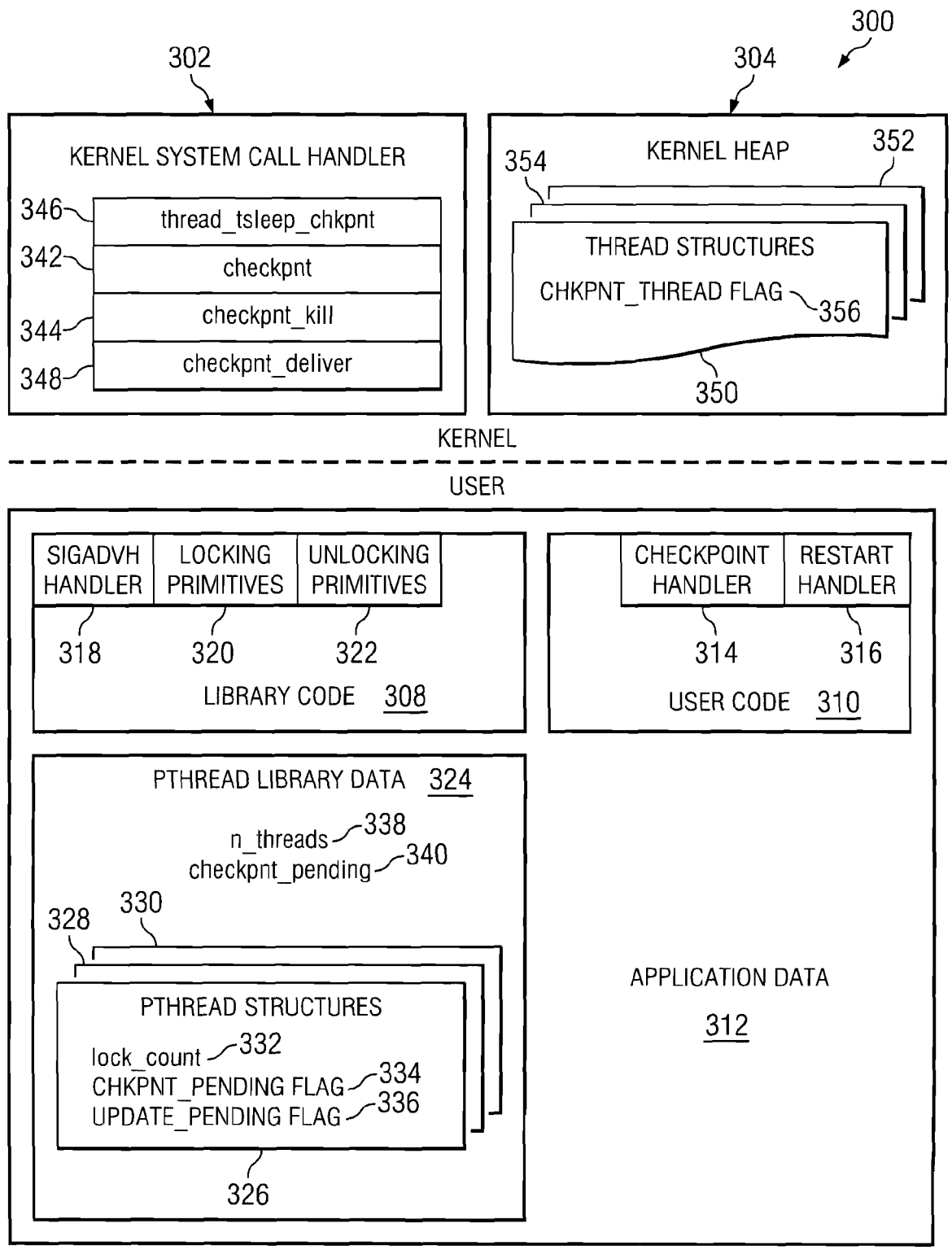
FIG. 3 is a diagram illustrating components used in managing threads for avoiding deadlocks when using a checkpoint or restart handler in accordance with a preferred embodiment of the present invention.

With reference now to FIG. 3, a diagram illustrating components used in managing threads for avoiding deadlocks when using a checkpoint or restart handler is depicted in accordance with a preferred embodiment of the present invention. Components illustrated in FIG. 3 may be implemented as instructions and data structures in a data processing system, such as data processing system 200 in FIG. 2.

In these examples, kernel 300 includes kernel system call handler 302 and kernel heap 304. User 306 includes library code 308, user code 310, and application data 312. Checkpoint handler 314 and restart handler 316 are located with user code 310. Library code 308 contains SIGADVH handler 318, locking primitives 320, and unlocking primitives 322. A locking primitive is the lowest level lock routine to implement a lock on a resource or object. An unlocking primitive is similarly the lowest level routine to implement the unlocking of the lock on the resource or object.

Application data 312 contains pthread library data 324 with pthread structures 326, 328, and 330. A pthread structure is present for each pthread. As illustrated, three pthread structures are shown for purposes of illustration. Of course, other numbers of pthread structures may be used depending on the particular implementation. In this example, pthread structure 326 includes lock_count 332, CHKPNT_PENDING flag 334, and UPDATE_PENDING flag 336. All of the pthread data structures contain this counter and the flags. Lock_count 332 indicates the number of locks taken by the thread associated with pthread structure 326. The CHKPNT_PENDING flag 334 is a flag used in a modified locking routine as described below in FIG. 7. If this flag is set and the thread does not own any locks, the thread will be suspended when the thread tries to take a lock. The UPDATE_PENDING flag 336 is used to determine whether to run a decrementer procedure as described in FIG. 8 below. This procedure is used to decrement n_threads 338 as part of a determination of when a mechanism, such as checkpoint handler 314, may be called. Checkpnt_pending 340 is a variable that is set to true when a checkpoint system call is made. The address of the checkpnt_pending variable can be passed to the kernel when registering the checkpoint and restart handlers. The registering of the checkpoint and restart handlers can be accomplished through a system call which can be implemented as a procedure in a kernel system call handler, such as kernel system call handler 302. When a checkpoint becomes pending, the kernel will set the value of the checkpnt_pending variable to 1. At restart time, the kernel will reset the variable to 0. The purpose of this flag is to override the pthread-level CHKPNT_PENDING flag. After a checkpoint completes, it is undesirable for a pthread to see the CHKPNT_PENDING flag set block when taking a lock. The thread first checks if checkpnt_pending is set, if not, the thread can clear the CHKPNT_PENDING pthread flag and carry on.

Kernel system call handler 302 contains checkpnt 342, checkpnt_kill 344, thread_tsleep_chkpnt 346, and checkpnt_deliver 348. These calls illustrated in kernel system call handler 302 are calls presently available in operating systems, such as AIX. Within kernel system call handler 302, checkpnt 342 is used to handle checkpoint calls. Checkpnt_kill 344 is used to initiate sending of a SIGADVH signal to other threads within a process in response to this function being called by a thread from that process. Thread-tsleep_chkpnt 346 is used to suspend or cause a thread to go into a sleep state. Checkpnt_deliver 348 is used to indicate that the execution of a handler, such as checkpoint handler 314, may occur without deadlocks. The call is made for this function from a last thread whose lock count goes to 0.

Kernel heap 304 contains thread structures 350, 352, and 354 in these examples. As illustrated, a one-to-one correspondence is present for thread structures in kernel heap 304 and pthread structures in pthread library data 324 because this is for a 1:1 model. Depending on the particular implementation, a one-to-one correspondence may not be present between pthread structures in pthread library data 324 and thread structures in kernel heap 304. Each thread structure contains a flag. In this example, thread structure 350 contains CHKPNT_THREAD flag 356. The other thread structures also contain this type of flag. CHKPNT_THREAD flag 356 is used to indicate the thread that ran the checkpoint handler. At restart, the kernel will run the restart handler on the same kernel thread. In this example, three thread structures are illustrated for purposes of illustration. Other numbers of thread structures may be used depending on the particular implementation.

Figure 4:
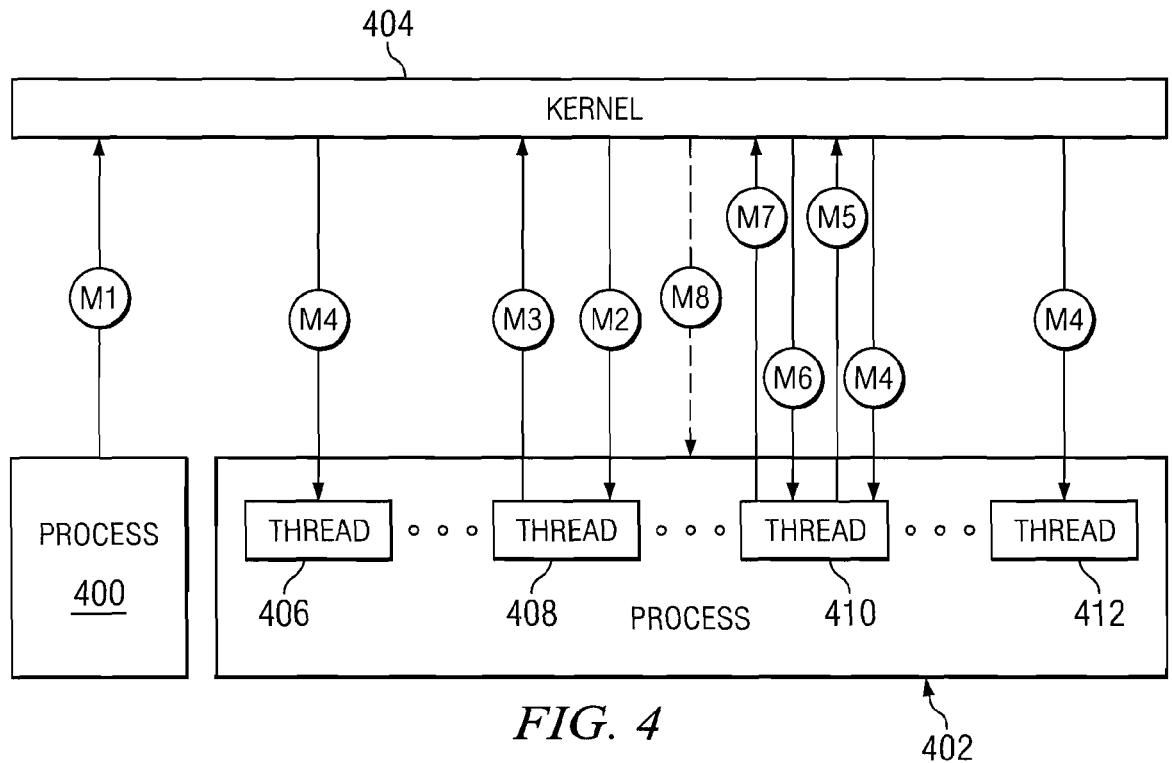
FIG. 4 is a diagram illustrating data flow used in a checkpoint operation in accordance with a preferred embodiment of the present invention.

Turning now to FIG. 4, a diagram illustrating data flow used in a checkpoint operation is depicted in accordance with a preferred embodiment of the present invention. Process 400 and process 402 are illustrated along with kernel 404 to provide an example of signals and messages passed between different components in controlling a checkpoint operation. Kernel 404 may be implemented using components from kernel 300 in FIG. 3 in these examples. Process 402 contains threads 406, 408, 410, and 412 in these examples. Process 400 initiates the checkpoint request on process 402 by sending a checkpoint call to kernel 404 (message M1). In response, kernel 404 sends a SIGADVH signal to process 402 in which this signal is received by thread 408 (message M2). In response to receiving this signal from kernel 404, thread 408 sets the value of a variable, such as n_threads 338 in FIG. 3, to the number of pthreads in the process and then issues a request to send a SIGADVH signal to all of the other threads within process 402 using a checkpnt_kill call (message M3).

In response to receiving this request, kernel 404 sends a SIGADVH signal to threads 406, 410, and 412 (messages M4). As a result of receiving this signal, a code is executed by each of these threads in the form of special signal handlers, namely the SIGADVH handler 318 in FIG. 3 in these examples. These signal handlers automatically decrement the value of a variable such as n_threads 338 in FIG. 3, if the lock count, such as lock_count 332 in FIG. 3, reaches 0 for the thread on which the handler is running. Otherwise, the special signal handler will set a flag, such as CHKPNT_PENDING flag 334 in FIG. 3, on the thread to indicate that a checkpoint is pending that will be checked by the thread locking and unlocking primitives.

Locking primitives, such as locking primitives 320 in FIG. 3, check for a checkpoint pending flag, CHKPNT_PENDING flag 334, before taking a lock. If this flag is set and no locks are owned by the threads, the thread is suspended. This suspended thread will not run until either the checkpoint fails or after the restart when the restart handler, such as restart handler 316 in FIG. 3, completes. If a thread owns one or more locks, this thread is allowed to take additional locks.

Unlocking primitives such as 322 in FIG. 3, can call a procedure at the end of the routine, which is entered after unlocking the resource or object. The called procedure begins by checking to see whether the checkpoint pending flag is set if the lock count, such as lock_count 332 in FIG. 3, is 0. If this flag is set, the value of a variable, n_threads 338 in FIG. 3, is decremented by 1. The last thread, whose lock count goes to 0, thread 410 in this example, informs kernel 404 that a checkpoint handler, such as checkpoint handler 314 in FIG. 3, may be invoked using a checkpnt_deliver call (message M5). The kernel 404 invokes a checkpoint handler, such as checkpoint handler 314 in FIG. 3 on thread 410 (message M6). The kernel detects that the checkpoint handler has exited (message M7) and control returns to the kernel. The kernel now suspends all the threads of the process (message M8) and writes the process state to a checkpoint file.

Figure 5:
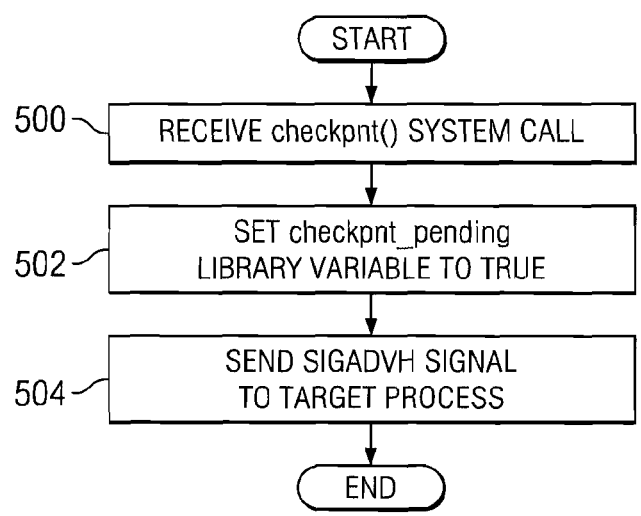
FIG. 5 is a flowchart of a procedure used for initiating a checkpoint operation in accordance with a preferred embodiment of the present invention.

With reference now to FIG. 5, a flowchart of a procedure used for initiating a checkpoint operation is depicted in accordance with a preferred embodiment of the present invention. The procedure illustrated in FIG. 5 may be implemented in a kernel, such as kernel 404 in FIG. 4.

The procedure begins by receiving a checkpnt( ) system call (step 500). This call may be received from a process, such as process 400 in FIG. 4. The checkpnt_pending library variable, such as checkpnt_pending 340 in FIG. 3, is set to true (step 502) in the process to be checkpointed such as process 402 and the SIGADVH signal is sent to this target process (step 504) and the procedure terminates thereafter. This initiates a checkpoint on process 402 in FIG. 4.

Figure 6:
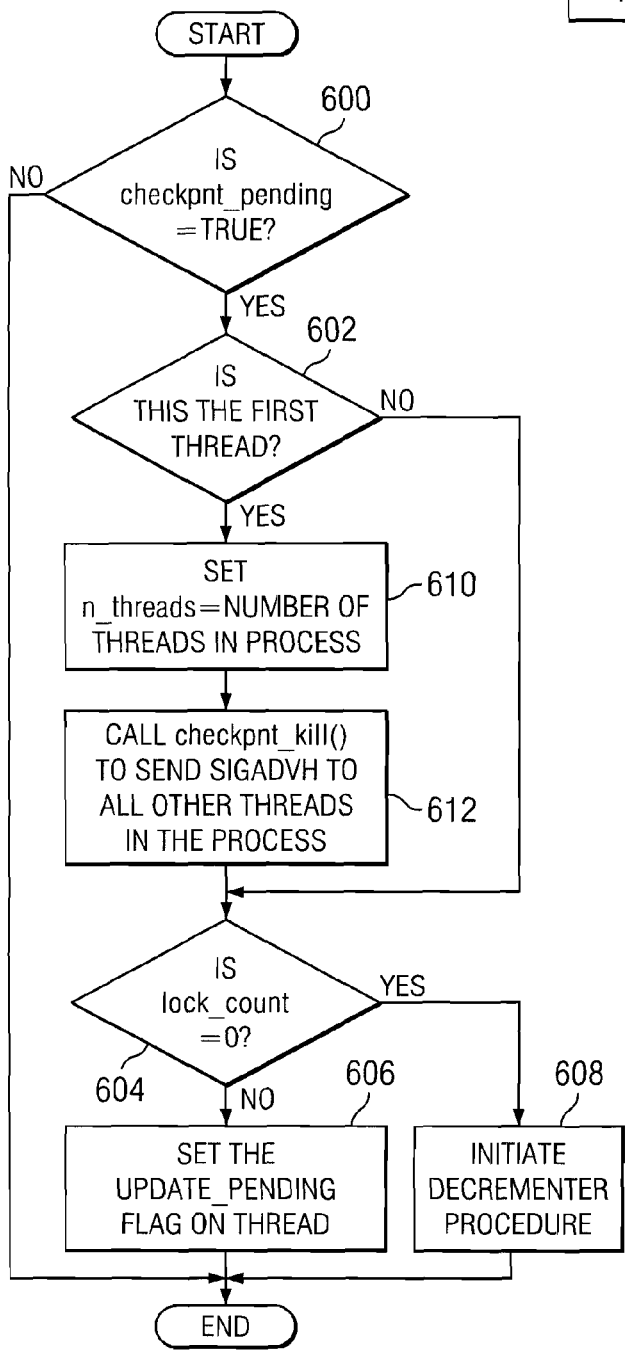
FIG. 6 is a flowchart of a procedure used for a SIGADVH handler in accordance with a preferred embodiment of the present invention.

Turning now to FIG. 6, a flowchart of a procedure used for a SIGADVH handler is depicted in accordance with a preferred embodiment of the present invention. The procedure illustrated in FIG. 6 may be implemented in a SIGADVH handler, such as SIGADVH handler 318 in FIG. 3. This handler is run by each thread that receives a SIGADVH signal, such as the one generated in step 504 in FIG. 5.

The procedure begins by making a determination as to whether the checkpnt_pending equals true (step 600). The checkpnt_pending variable remains true as long as the checkpoint is pending for the process. If the checkpnt_pending variable equals true, a determination is made as to whether this is the first thread to receive the SIGADVH signal (step 602). If this thread on which the process is running is not the first thread, a determination is made as to whether the lock_count is equal to 0 (step 604). If the lock_count is not equal to 0, the UPDATE_PENDING flag is set on the thread (step 606) and the procedure terminates thereafter. The UPDATE_PENDING flag is used later by the unlocking routine to determine if the decrementer procedure has been run for this thread. The decrementer procedure is described in more detail in FIG. 9 below Referring again to step 604, if the lock_count is equal to 0, the decrementer procedure is initiated (step 608) and the procedure terminates thereafter. With reference again to step 602, if the thread on which the handler is running is the first thread, n_threads is set equal to the number of threads in the process (step 610). The checkpnt_kill( ) is called to send a SIGADVH signal to all other threads in the process to initiate execution of this handler in those threads (step 612) and the procedure returns to step 604 as described above. Referring again to step 600, if the checkpnt_pending does not equal true, the procedure terminates. This could happen for special cases where a checkpoint was canceled after it was initiated, in which case the kernel would set checkpnt_pending to false.

Figure 7:
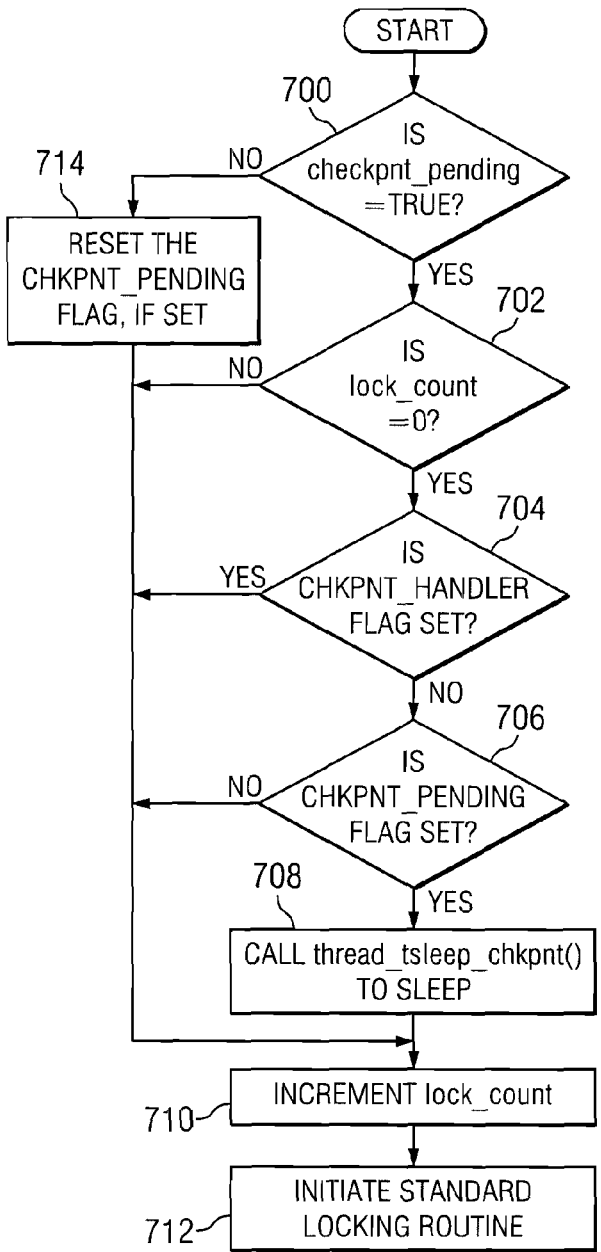
FIG. 7 is a flowchart of a procedure used for a modified locking primitive in accordance with a preferred embodiment of the present invention.

With reference now to FIG. 7, a flowchart of a procedure used for a modified locking primitive is depicted in accordance with a preferred embodiment of the present invention. The procedure illustrated in FIG. 7 may be implemented in a thread, such as thread 406, 408, 410, or 412 in FIG. 4.

The procedure begins by making a determination as to whether the checkpnt_pending equals true (step 700). If the checkpnt_pending equals true, a determination is made as to whether lock_count for the thread is equal to 0 (step 702). If lock_count for the thread is equal to 0, a determination is made as to whether the CHKPNT_HANDLER flag is set (step 704). The CHKPNT_HANDLER flag identifies the thread on which the checkpoint handler is running and if the flag is set, the thread is allowed to take locks even if the checkpoint is pending. This can be implemented as a flag in the pthread structure 326, such as CHKPNT_PENDING flag 334 and UPDATE_PENDING 336 flag in FIG. 3. If the CHKPNT_HANDLER flag is not set, a determination is made as to whether the CHKPNT_PENDING flag is set (step 706). The CHKPNT_PENDING flag indicates the thread has already run the decrementer procedure.

If the CHKPNT_PENDING flag is set, the thread_tsleep_chkpnt( ) is called to place the thread in a sleep state (step 708). The thread is only awakened when the restart handler completes. The lock_count for the thread is incremented (step 710) before initiating the standard locking routine is initiated (step 712) and the procedure terminates thereafter.

With reference again to step 706, if the CHKPNT_PENDING flag is not set, the procedure proceeds to step 710 as described above. Turning again to step 704, if the CHKPNT_HANDLER flag is set, the procedure proceeds to step 710 as described above. Referring again to step 702, if the lock_count is not equal to 0, the procedure proceeds to step 710 as described above. With reference again to step 700, if the checkpnt_pending does not equal true, the CHKPNT_PENDING flag is reset if the flag is already set (step 714) and the procedure proceeds to step 710 as described above. In all the above steps, which proceed directly to step 710 from steps 700, 702, 704 and 706, the thread is allowed to take the lock and the thread is not put to sleep as in step 708.

Figure 8:
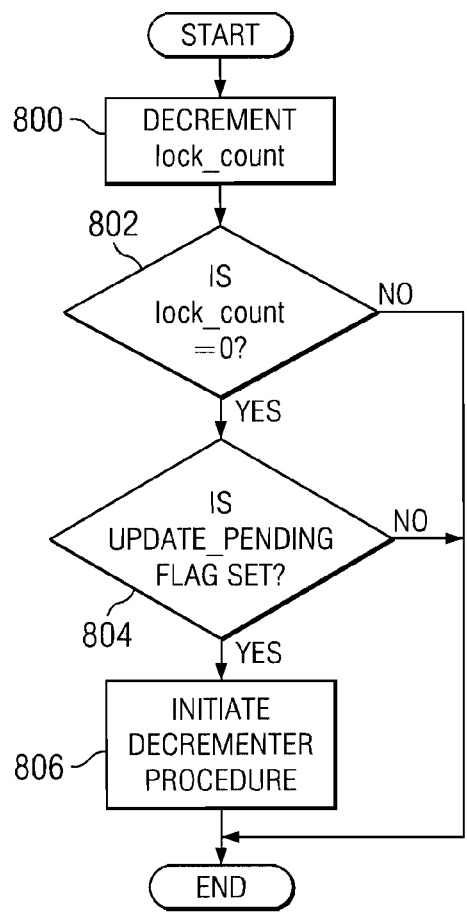
FIG. 8 is a flowchart of a procedure used for an unlocking routine that can be called from the tail end of the standard unlocking primitives in accordance with a preferred embodiment of the present invention.

Turning now to FIG. 8, a flowchart of a procedure used for an unlocking routine is depicted in accordance with a preferred embodiment of the present invention. The procedure illustrated in FIG. 8 may be implemented in a library code, such as library code 308 in FIG. 3.

The flowchart specifically depicts the modifications at the back end of the unlocking routine. After completing the standard unlocking procedure to release a lock, the present invention adds the following procedure, which begins by decrementing lock_count for the thread (step 800). A determination is made as to whether lock_count is equal to 0 (step 802). If lock_count is equal to 0, a determination is made as to whether the UPDATE_PENDING flag is set (step 804). The UPDATE_PENDING flag indicates that a checkpoint is pending on this process, but the decrementer procedure has not been run to decrement count in n_threads 338 in FIG. 3. If the UPDATE_PENDING flag is set, the decrementer procedure is initiated (step 806) and the procedure terminates thereafter. The decrementer procedure is described in more detail in FIG. 9 below.

Referring again to step 804, if the UPDATE_PENDING flag is not set, the procedure terminates. Turning again to step 802, if lock_count is not equal to 0, the procedure terminates.

Figure 9:
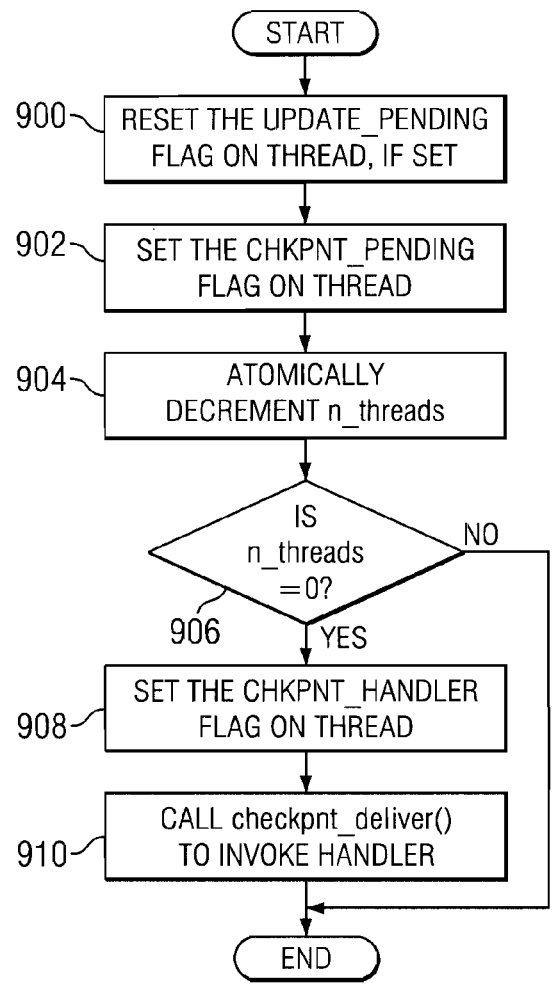
FIG. 9 is a flowchart of a procedure used for a decrementer procedure in accordance with a preferred embodiment of the present invention.

With reference now to FIG. 9, a flowchart of a procedure used for a decrementer procedure is depicted in accordance with a preferred embodiment of the present invention. This decrementer procedure is used to determine when a handler should be invoked. The procedure illustrated in FIG. 9 may be implemented in library code, such as library code 308 in FIG. 3. These steps are executed by all of the threads with the last thread whose lock count is 0 initiating invocation of the handler. The procedure begins by resetting the UPDATE_PENDING flag on the thread if the flag is already set (step 900). The CHKPNT_PENDING flag is set on the thread (step 902). N_threads is decremented atomically (step 904). Next, a determination is made as to whether n_threads is equal to 0 (step 906). If n_threads is equal to 0, the CHKPNT_HANDLER flag is set on the pthread (step 908), as the kernel will invoke the checkpoint handler on this thread. The checkpnt_deliver( ) is called to invoke the handler (step 910) and the procedure terminates thereafter.

With reference again to step 906, if n_threads is not equal to 0, the procedure terminates.

Figure 10:
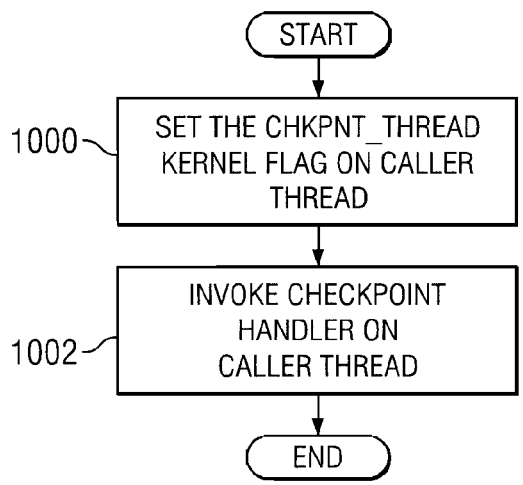
FIG. 10 is a flowchart of a procedure used for initiating execution of a handler when all of the threads have released all of their locks and have been suspended or placed in a sleep state in accordance with a preferred embodiment of the present invention.

Turning now to FIG. 10, a flowchart of a procedure used for initiating execution of a handler when all of the threads have released all of their locks and have been suspended or placed in a sleep state is depicted in accordance with a preferred embodiment of the present invention. The procedure illustrated in FIG. 10 may be implemented in a kernel system call handler, such as kernel system call handler 302 in FIG. 3. In particular, this procedure is initiated when a call is made for the function, checkpnt_deliver 348, in FIG. 3.

The procedure begins by setting the CHKPNT_THREAD kernel flag on the caller thread (step 1000). The checkpoint handler on the caller thread is invoked (step 1002) and the procedure terminates thereafter.

Figure 11:
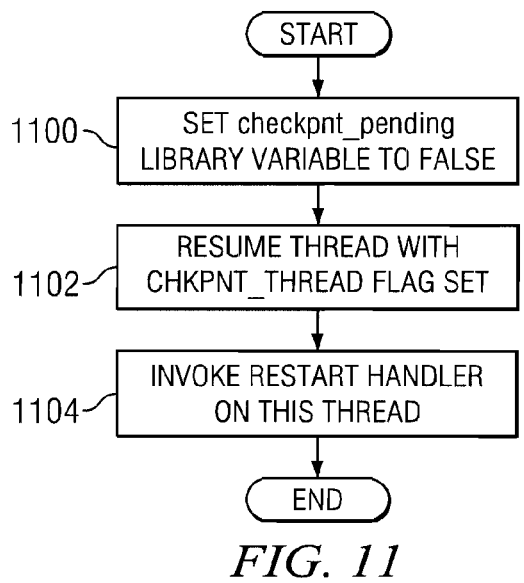
FIG. 11 is a flowchart of a procedure used for a restart procedure in accordance with a preferred embodiment of the present invention.

With reference now to FIG. 11, a flowchart of a procedure used for a restart procedure is depicted in accordance with a preferred embodiment of the present invention. The procedure illustrated in FIG. 11 may be implemented in a kernel system call handler, such as kernel system call handler 302 in FIG. 3.

The procedure begins by setting the checkpnt_pending library variable to false (step 1100). The thread that has the CHKPNT_THREAD flag set is resumed (step 1102). The restart handler is invoked on this thread is invoked (step 1104) with the procedure terminating thereafter. At the completion of the restart handler, all the suspended threads are resumed and restarted.

Thus, the present invention provides an improved method, apparatus, and computer instructions for handling checkpoint processes in a manner that avoids deadlocks. The mechanism of the present invention does not initiate a checkpoint handler automatically when a signal is received requesting a checkpoint. Instead, the mechanism of the present invention keeps count of threads, which hold locks. Threads with no locks are suspended if the threads try to take a lock. After all of the threads which own locks have released all their locks, the checkpoint handler is invoked. This mechanism ensures that no locks are being held. As a result, a checkpoint handler may make many types of calls without a block or a lock occurring. Thus, deadlocks are avoided in the checkpoint and restart operation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for handling a plurality of threads, the data processing system comprising:
    a memory, wherein the memory includes a set of instructions;
    a processor connected to the memory, wherein the processor executes the set of instructions;
    receiving means for receiving a first request from a first process, wherein the first request is a checkpoint request;
    first sending means for sending a selected signal to a second process, wherein the first sending means comprises:
        second sending means for sending the selected signal from a kernel to the second process, wherein the selected signal is detected by a particular thread within the plurality of threads in the second process;
        third sending means, responsive to detecting the selected signal by the particular thread, for sending a second request from the particular thread to the kernel, wherein the second request requests sending of a particular signal to all other threads within the plurality of threads; and
        fourth sending means, responsive to detecting the second request, for sending the particular signal from the kernel to all of the other threads within the plurality of threads;
    suspending means, responsive to receiving the selected signal in the second process, for suspending a thread within the plurality of threads if the thread no longer has any locks and attempts to take a lock; and
    initiating means for initiating a procedure if all of the plurality of threads have no locks.

2. The data processing system of claim 1, wherein the procedure is a checkpoint handler.

* * * * *